G. T. GUY.
WHEEL OR PULLEY.
APPLICATION FILED SEPT. 20, 1917.
1,369,337.
Patented Feb. 22, 1921.
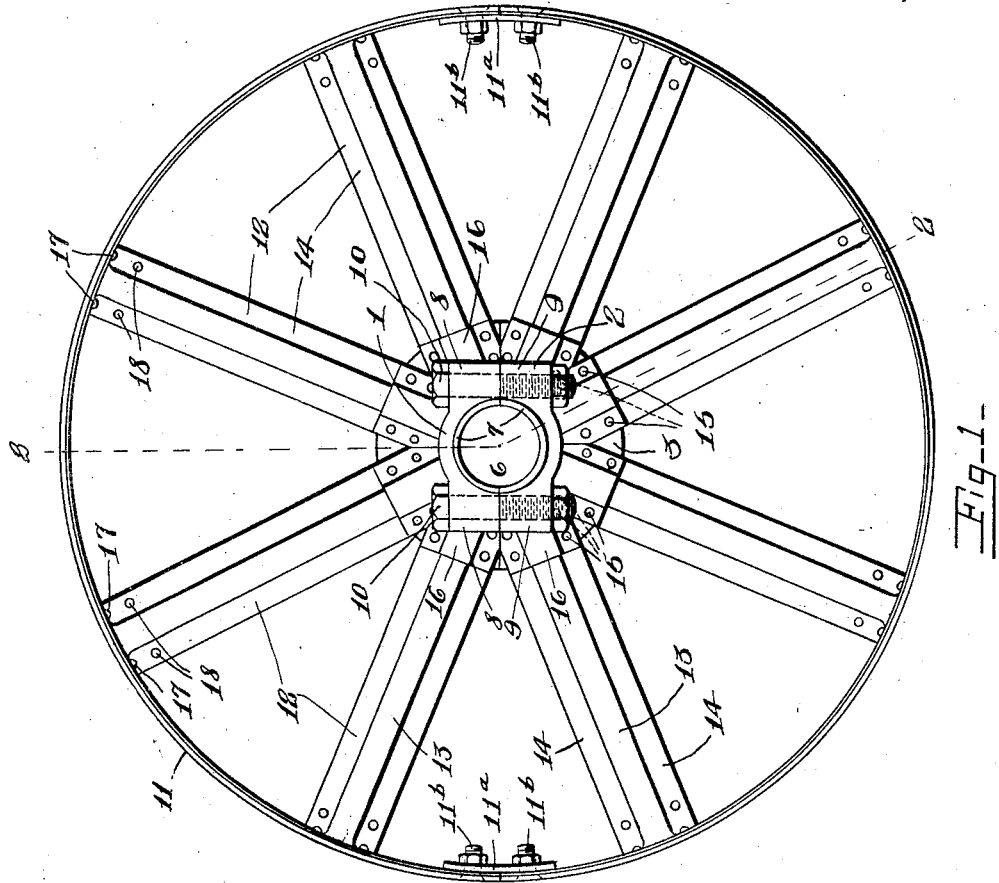
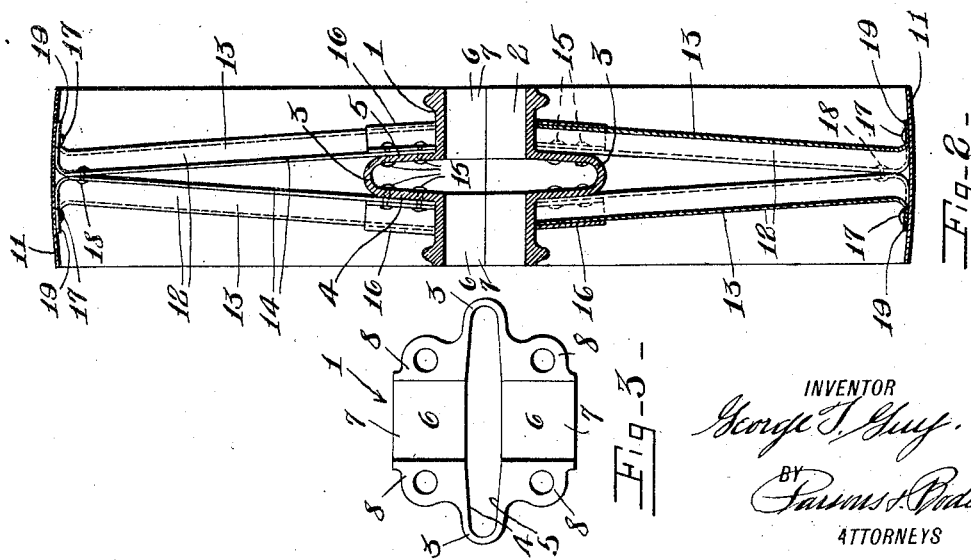
INVENTOR
George T. Guy.
BY
ATTORNEYS

UNITED STATES PATENT OFFICE.

GEORGE T. GUY, OF ONEIDA, NEW YORK.

WHEEL OR PULLEY.

1,369,337.  Specification of Letters Patent.  Patented Feb. 22, 1921.

Application filed September 20, 1917. Serial No. 192,340.

*To all whom it may concern:*

Be it known that I, GEORGE T. GUY, a citizen of the United States, residing at Oneida, in the county of Madison and State of New York, have invented a certain new and useful Wheel or Pulley, of which the following is a specification.

This invention has for its object a wheel or pulley which is particularly simple, tight and rigid in construction but possessing sufficient flexibility to be clamped to shafts varying in size, and which is also particularly economical in manufacture and readily attachable to the shaft; and the invention consists in the novel features and in the combinations and constructions hereinafter set forth and claimed.

In describing this invention, reference is had to the accompanying drawings in which like characters designate corresponding parts in all the views.

Figure 1 is an elevation of a pulley embodying my invention.

Fig. 2 is a sectional view thereof on line 2—2, Fig. 1.

Fig. 3 is an inner face view of one of the sections of the hub.

This pulley comprises generally, a hub having a circumferential hollow rib, the interior of which opens into the bore of the hub and spokes attached opposite each other in pairs to the outer sides of the flanges of said rib by fastening means extending through the spokes and said flanges and placeable in position through the flanges, and the spokes from the inside of said rib.

The hub is divided into two sections or halves provided with means for clamping the sections together onto the shaft.

1 and 2 designate the sections of the hub, and 3 is the circumferentially extending arc-shaped hollow rib, the opposite walls 4, 5 of which are spaced apart and constitute flanges to which the spokes are secured. The interior of the rib 3, that is, the space between the flanges 4, 5 opens into the bore 6 of the hub so that the fastening means for the spokes can be placed in position from the interior of the hub sections.

The hub sections also include sectional tubular portions 7 on opposite sides of the rib 3 and two pairs of jaws 8, 9 at the ends of the sections 1, 2 respectively, these jaws 8, 9 being clamped together in any suitable manner as by bolts 10 extending through the jaws 8, 9 and nuts threading on the bolts the bolts passing on opposite sides of the bore or shaft opening of the hub.

11 is the rim of the wheel which is divided and the sections joined together in any suitable manner as by the plates 11ª lapping the opposing end portions of the rim sections and secured thereto by screw bolts 11ᵇ.

12 are the spokes. The spokes as here shown are formed of sheet metal and have raised ribs 13 extending lengthwise thereof and flanges 14 on opposite sides of the rib, the inner ends of the spokes lapping the flanges 4, 5 respectively and being secured thereto by fastening members as rivets 15 extending from the interior of the rib 3 or from the space between the flanges 4, 5 through the flanges 14 of the spokes.

Usually, clamping or stiffening pieces as 16 are provided at the inner ends of the spokes, these clamping pieces being individual to the spokes and having ribs and flanges corresponding with the ribs 13 and flanges 14 of the spokes. The fastening members 15 also pass through the flanges of the clamping pieces 16.

The spokes secured to the flanges 4, 5 are arranged with their inner ends opposite to each other. Said spokes are usually arranged opposite each other in pairs and the members of the pairs converge as they approach the rim 11 of the wheel, and are secured as by rivets 17 at their outer ends to the rim and are also secured together near their outer ends as by rivets 18 extending through their flanges 14. The rivets 17 extend through the outturned ends 19 of the spokes which ends 19 lap the inner face of the rim.

Owing to the hollow rib 3 maximum spoke or arm receiving area is provided as the spokes are opposite to each other and hence twice the number of spokes can be provided on the same hub as heretofore, this feature being of importance especially in large wheels or pulleys. Furthermore, the pulley is readily assembled as any variations or un-uniformness in the rib 3 due to molding as well as un-uniformness, within certain limits, in the lengths of the spokes is offset by the fact that each spoke is attached individually to the flange 4 or 5 and the perforations in the flanges 4, 5 and the spokes for receiving the rivets can be properly located for each individual spoke and each spoke, owing to the hollow rib 3, can be individually secured to the opposing flanges by the rivets inserted from the inside of the rib.

Furthermore, owing to the rib 3, a maximum number of spokes can be used and each has sufficient bearing on the rib to be rigidly secured thereto, and owing to the arrangement of the spokes, the rim is readily arranged concentric with the center of the pulley irrespective of any variation as all rims for a given size of pulley will be the same, and when attached to the spokes will center the spokes. Although the pulley when assembled is particularly rigid nevertheless it is flexible enough to provide a positive compression on the shaft on which it is mounted, upon tightening of the bolts 10.

What I claim is:

A pulley having a sectional hub formed with a circumferential hollow rib, the interior of which opens into the interior of the bore of the hub, the opposite walls of the ribs constituting flanges spaced apart, spokes having their inner ends lapping the outer sides of said flanges, individual clamping pieces inclosing the inner ends of the spokes, and means extending from the interior of the rib through the clamping pieces, the spokes, and the underlying flanges, for securing the clamping pieces and the spokes to the flanges, substantially as and for the purpose described.

In testimony whereof I have hereunto signed my name at Syracuse, in the county of Onondaga and State of New York, this 5th day of September, 1917.

GEORGE T. GUY.